United States Patent
Uchiyama et al.

(10) Patent No.: US 8,550,201 B2
(45) Date of Patent: Oct. 8, 2013

(54) SWING ARM FOR MINIATURIZED VEHICLE

(75) Inventors: Mikio Uchiyama, Wako (JP); Hirotsugu Kuboyama, Wako (JP); Shinichi Ozeki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/587,412

(22) Filed: Aug. 16, 2012

(65) Prior Publication Data

US 2013/0049323 A1    Feb. 28, 2013

(30) Foreign Application Priority Data

Aug. 31, 2011   (JP) .................................. 2011-188392

(51) Int. Cl.
  *B62D 61/02*   (2006.01)
  *B62K 11/02*   (2006.01)

(52) U.S. Cl.
  USPC .......................................................... 180/227

(58) Field of Classification Search
  USPC ................................................. 180/219, 227
  See application file for complete search history.

(56) References Cited

U.S. PATENT DOCUMENTS

| 4,558,761 A * | 12/1985 | Boyesen ........................ 180/227 |
| 7,815,005 B2 * | 10/2010 | Masuda et al. ................ 180/227 |
| 2008/0196960 A1 * | 8/2008 | Brown et al. .................. 180/227 |
| 2010/0065363 A1 * | 3/2010 | Goodwin ....................... 180/227 |

FOREIGN PATENT DOCUMENTS

JP    2008-081107 A    4/2008

\* cited by examiner

*Primary Examiner* — Kevin Hurley
*Assistant Examiner* — Marc A Scharich
(74) *Attorney, Agent, or Firm* — Birch, Stewart, Kolasch & Birch, LLP

(57) ABSTRACT

A pair of left and right arm portions integrally formed by molding with a pivot portion formed on front ends and an axle support portion formed on rear ends. An opening portion with a peripheral portion endlessly contiguously formed by a pivot portion that connects front ends of both arm portions, a cross portion and both arm portions. A pair of left and right indented recessed portions is formed on an inner surface of a wall having support bosses projecting out of a lower surface of the wall. A pair of left and right reinforcing ribs that is positioned outside both recessed portions in the vehicle widthwise direction are integrally formed on the inner surface of the wall on which the support bosses is formed in a projecting manner toward the inside of the cross portion.

20 Claims, 4 Drawing Sheets

SWING ARM FOR MINIATURIZED VEHICLE

CROSS-REFERENCE TO RELATED APPLICATIONS

The present application claims priority under 35 USC 119 to Japanese Patent Application No. 2011-188392 filed Aug. 31, 2011 the entire contents of that are hereby incorporated by reference.

FIELD OF THE INVENTION

The present invention relates to a swing arm for a miniaturized vehicle wherein a pair of left and right arm portions extend in the longitudinal direction with a pivot portion that is formed on front ends of both arm portions. An axle support portion is formed on rear ends of both arm portions in a state wherein the axle support portion pivotally supports an axle of a rear wheel. A cross portion is arranged between both arm portions and connects both arm portions behind the pivot portion. The arm portions are integrally formed with each other by molding. At least the cross portion is formed into a hollow shape with a pair of left and right support bosses for supporting a shock absorber being integrally formed on a lower wall or an upper wall of the cross portion in an outwardly projecting manner.

DESCRIPTION OF BACKGROUND ART

With respect to a miniaturized vehicle such as a motorcycle, it has been known that a swing aim is formed using a light alloy such as an aluminum alloy or a magnesium alloy for enhancing the reduction of weight to make the product more attractive. In a miniaturized vehicle disclosed in JP-A-2008-81107, a swing arm is integrally formed by die-casting using an aluminum alloy.

In forming a swing arm by casting, when a wall thickness of the swing arm is increased for increasing the rigidity of the swing arm, a cooling rate of a thick wall portion becomes slow resulting in a drawback wherein cavities occur in the portion. Thus, a simple increase in the wall thickness cannot be adopted. More particularly, with respect to a swing arm on which a shock absorber is supported, it is desirable to make the occurrence of cavities difficult while increasing the rigidity of a support boss that is formed on a cross portion for supporting the shock absorber.

SUMMARY AND OBJECTS OF THE INVENTION

The present invention has been made in view of the above-mentioned circumstances. It is an object of an embodiment of the present invention to provide a swing arm for a miniaturized vehicle wherein the rigidity of a support boss that is formed on a cross portion for supporting a shock absorber can be increased while suppressing the occurrence of cavities.

To achieve the above-mentioned object, according to an embodiment of the present invention, in a swing arm for a miniaturized vehicle is provided wherein a pair of left and right arm portions extend in the longitudinal direction. A pivot portion is formed on front ends of both arm portions with an axle support portion that is formed on rear ends of both arm portions in a state wherein the axle support portion pivotally supports an axle of a rear wheel. A cross portion is arranged between both arm portions and connects both arm portions behind the pivot portion. The arm portions are integrally formed with each other by molding. At least the cross portion is formed into a hollow shape, and a pair of left and right support bosses for supporting a shock absorber is integrally formed on a lower wall or an upper wall of the cross portion in an outwardly projecting manner. The pivot portion is contiguously formed with both arm portions in the vehicle widthwise direction in a state where the pivot portion connects front ends of both arm portions to each other. An opening portion whose peripheral portion is endlessly contiguously formed with upper and lower ends that are opened and being formed by the cross portion, the pivot portion and the pair of left and right arm portions. A pair of left and right recessed portions is indented toward a support boss side and is formed on an inner surface of a wall on that the support bosses formed in a projecting manner out of the lower wall and the upper wall of the cross portion. A pair of left and right reinforcing ribs is positioned outside the recessed portions in the vehicle widthwise direction is integrally formed on the inner surface of the wall on that the support bosses and are formed in a projecting manner out of the lower wall and the upper wall of the cross portion toward the inside of the cross portion.

According to an embodiment of the present invention, a support hole is formed in the support boss behind a center portion of the support boss in the longitudinal direction of the support boss, and the reinforcing ribs are formed in a frontwardly projecting manner from a rear wall of the cross portion. Front ends of the reinforcing ribs are positioned in front of rear ends of the recessed portions.

According to an embodiment of the present invention, the arm portions are formed into an angular cylindrical shape having a rectangular transverse cross section.

According to an embodiment of the present invention, the shock absorber extends vertically and is made to pass through the opening portion in a state where the shock absorber is supported by the support bosses that project toward the outside from the lower wall of the cross portion. Core removal holes through which a core is removed are formed on inner walls of both arm portions at portions where the core removal holes face the opening portion.

According to an embodiment of the present invention, communication holes that permit the inside of the arm portions to communicate with the inside of the pivot portion are formed in connecting portions between both arm portions and the pivot portion respectively.

According to an embodiment of the present invention, a pair of left and right bearings is interposed between a support shaft that is made to pass through the pivot portion and the pivot portion in a state where the left and right bearings are arranged outside the pair of communication holes. A pair of left and right first seal members is arranged between the bearings and the communication holes and a pair of left and right second seal members is arranged between both bearings and the outside are interposed between the pivot portion and the support shaft.

According to an embodiment of the present invention, the opening portion whose peripheral portion is endlessly contiguously is formed by the pivot portion that is contiguously formed with both arm portions in the vehicle widthwise direction in a state where the pivot portion connects the front ends of both arm portions to each other, the cross portion and the pair of left and right arm portions is formed in a state where the opening portion has an upper and lower ends opened. Accordingly, the rigidity of the front portion of the swing arm can be increased. Further, out of the lower wall and the upper wall of the cross portion, on the inner surface of the wall on which the support bosses are formed in a projecting manner, the pair of left and right recessed portions are formed and also the pair of left and right reinforcing ribs are integrally formed. Accordingly, it is possible to efficiently increase the rigidity of the cross portion while suppressing an increase in the thickness of the wall of the cross portion at the portions on which the support bosses are formed and thereby the occurrence of a cavity can be suppressed.

According to an embodiment of the present invention, the support hole that is formed in the support boss is positioned behind a center portion of the support boss in the longitudinal direction of the support boss, and the reinforcing ribs are formed in a frontwardly extending manner from the rear wall of the cross portion. Accordingly, the rigidity of the rear wall can be efficiently increased by the reinforcing ribs corresponding to an increase in the stress applied to the rear wall of the cross portion.

According to an embodiment of the present invention, the arm portions are formed into an angular cylindrical shape having a rectangular transverse cross section. Thus, the rigidity of the arm portion can be increased while reducing the number of parts.

According to an embodiment of the present invention, core removal holes through which the core is removed are formed on the inner walls of both arm portions at the portions where the core removal holes face the opening portion whose peripheral portion is endlessly contiguously formed, whose upper and lower ends are opened, and through which the shock absorber is made to pass. Accordingly, the core removal holes are formed at portions of the swing arm where the rigidity is increased due to the endless continuous connection. Thus, it is possible to suppress the large lowering of the rigidity of the swing arm due to the formation of the core removal holes.

According to an embodiment of the present invention, the communication holes that make the inside of the angular cylindrical arm portions communicate with the inside of the hollow pivot portion are formed in the connecting portions between both arm portions and the pivot portion respectively. Accordingly, a wall thickness of the swing arm that is formed by integral molding can be made uniform, the occurrence of cavities can also be suppressed, and cores for forming the arm portions and a core for forming the pivot portion can be formed as an integral part.

According to an embodiment of the present invention, the intrusion of water into bearings that are interposed between the support shaft and the pivot portion and are arranged outside the communication holes from the communication holes side and the intrusion of water into the bearings from the outside can be prevented by the first sealing members and the second sealing members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings that are given by way of illustration only, and thus are not limitative of the present invention, and wherein.

DETAILED DESCRIPTION OF THE PREFERRED EMBODIMENTS

An embodiment of the present invention is explained in conjunction with FIGS. 1 to 4. In the explanation made hereinafter, the frontward and rearward directions, the upward and downward directions, and the leftward and rightward directions are directions as viewed from a rider who rides on a motorcycle.

Figure 1:
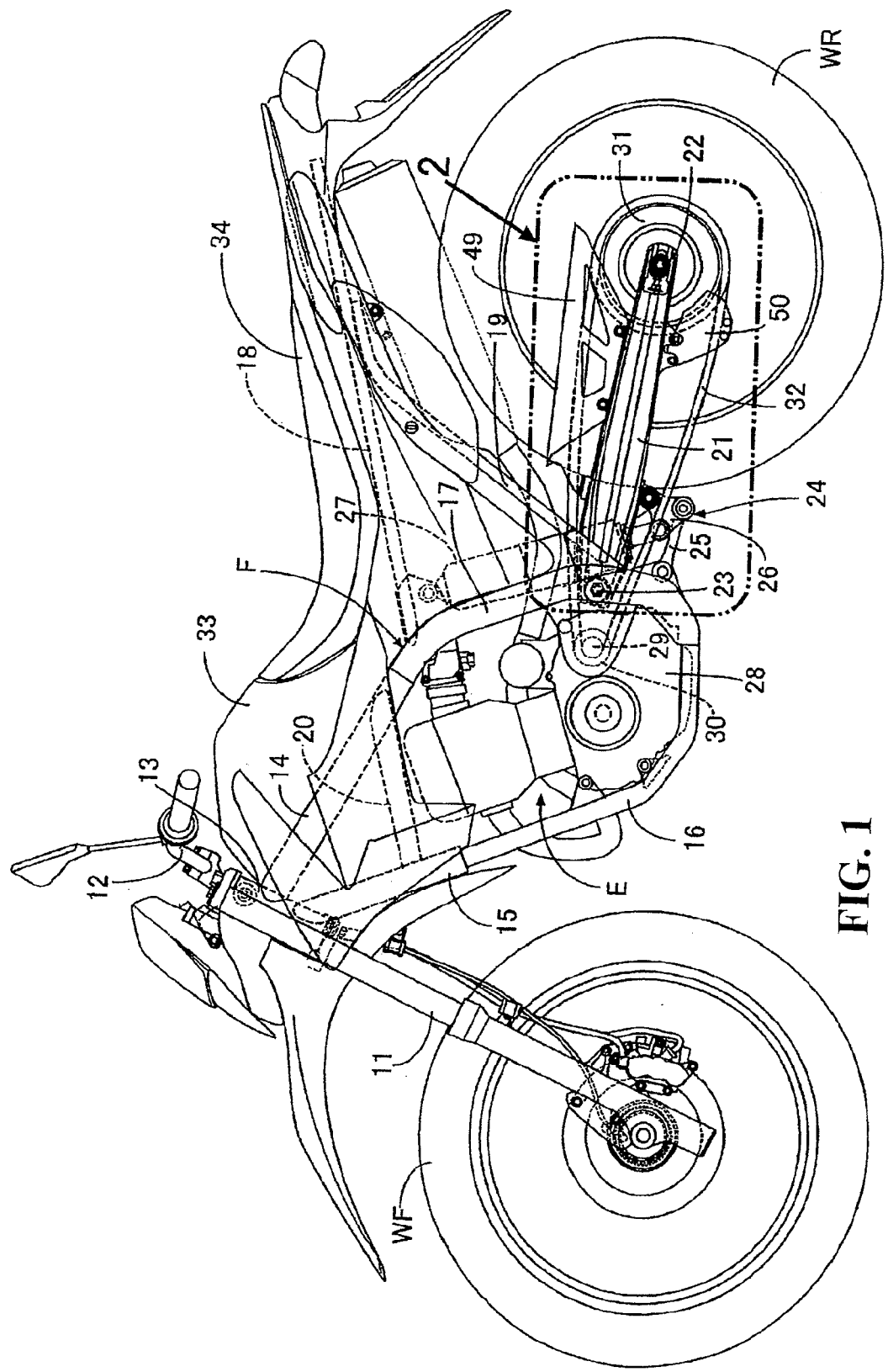
FIG. 1 is a left side view of a motorcycle.

As illustrated in FIG. 1, a vehicle body frame F of a motorcycle that is a miniaturized vehicle includes a head pipe 13 that supports a front fork 11 that pivotally supports a front wheel WF and a bar-shaped steering handle 12 in a steerable manner. A pair of left and right main frames 14 extend in the rearward and downward direction from the head pipe 13 with a down frame 15 that extends in the rearward and downward direction from the head pipe at a steeper angle than the main frames 14. A pair of left and right lower frames 16 is connected to a lower end portion of the down frame 15 and extend in the rearward direction with a pair of left and right pivot frames 17 that include upper end portions thereof joined to rear end portions of the main frames 14 and extending in the downward direction with lower end portions thereof connected to rear end portions of both lower frames 16. A pair of left and right seat rails 18 has front end portions thereof connected to rear portions of the main frames 14 and extends in the rearward direction. A pair of left and right rear frames 19 is provided that connect intermediate portions of both pivot frames 17 in the vertical direction and rear portions of both seat rails 18 to each other. A reinforcing frame 20 connects a lower portion of the down frame 15 and both main frames 14 to each other.

On the vehicle body frame F, an engine E is arranged in a space surrounded by the main frames 14, the down frame 15, the lower frames 16, and the pivot frames 17 are mounted. On lower portions of the pivot frames 17, a front end portion of a swing arm 21 that pivotally supports an axle 22 of a rear wheel WR on a rear end portion thereof is pivotally supported in a vertically swingable manner by way of a support shaft 23. A link mechanism 24 is arranged between the lower portions of the pivot frames 17 and the swing arm 21. The link mechanism 24 includes a link rod 25 that has one end portion thereof connected to the lower portions of the pivot frames 17 in a rotatable manner; and a link member 26 that is rotatably supported on the swing arm 21 and to that the other end portion of the link rod 25 is rotatably connected. A shock absorber 27 includes a spring and a damper and is arranged between the link member 26 and upper portions of the pivot frames 17.

A transmission not shown in the drawing is housed in the inside of a crankcase 28 operatively connected to the engine E. An output shaft 29 of the transmission projects leftward from the crankcase 28. An endless chain 32 extends between and is wound around a drive sprocket 30 that is mounted on the output shaft 29 and a driven sprocket 31 that is mounted on the axle 22 of the rear wheel WR.

Further, a fuel tank 33 is mounted on both main frames 14 above the engine E, and a rider's seat 34 is arranged behind the fuel tank 33 in a state where the rider's seat 34 is supported on the seat rails 18.

Figure 2:
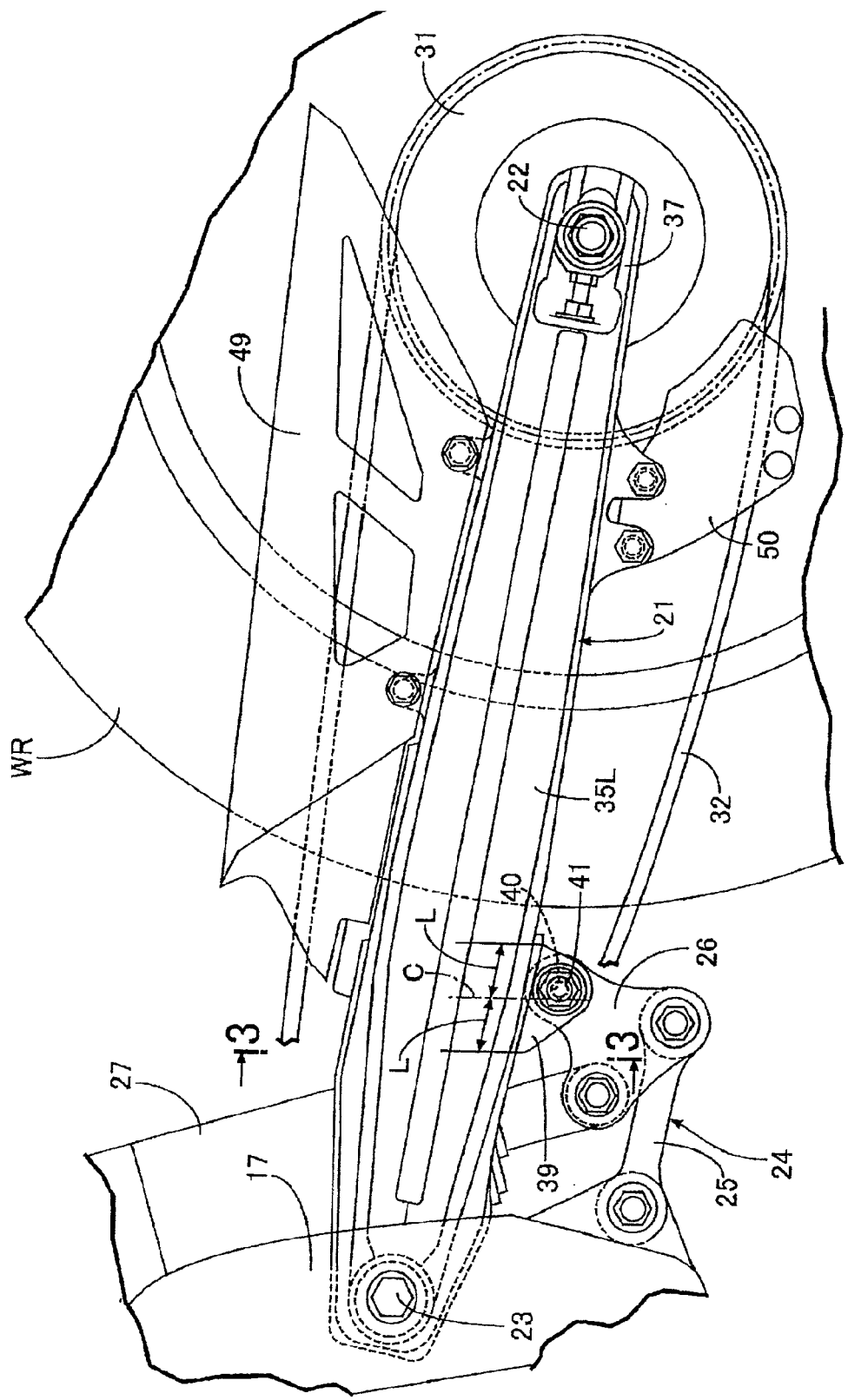
FIG. 2 is an enlarged view of a portion indicated by an arrow 2 in FIG. 1.
Figure 3:
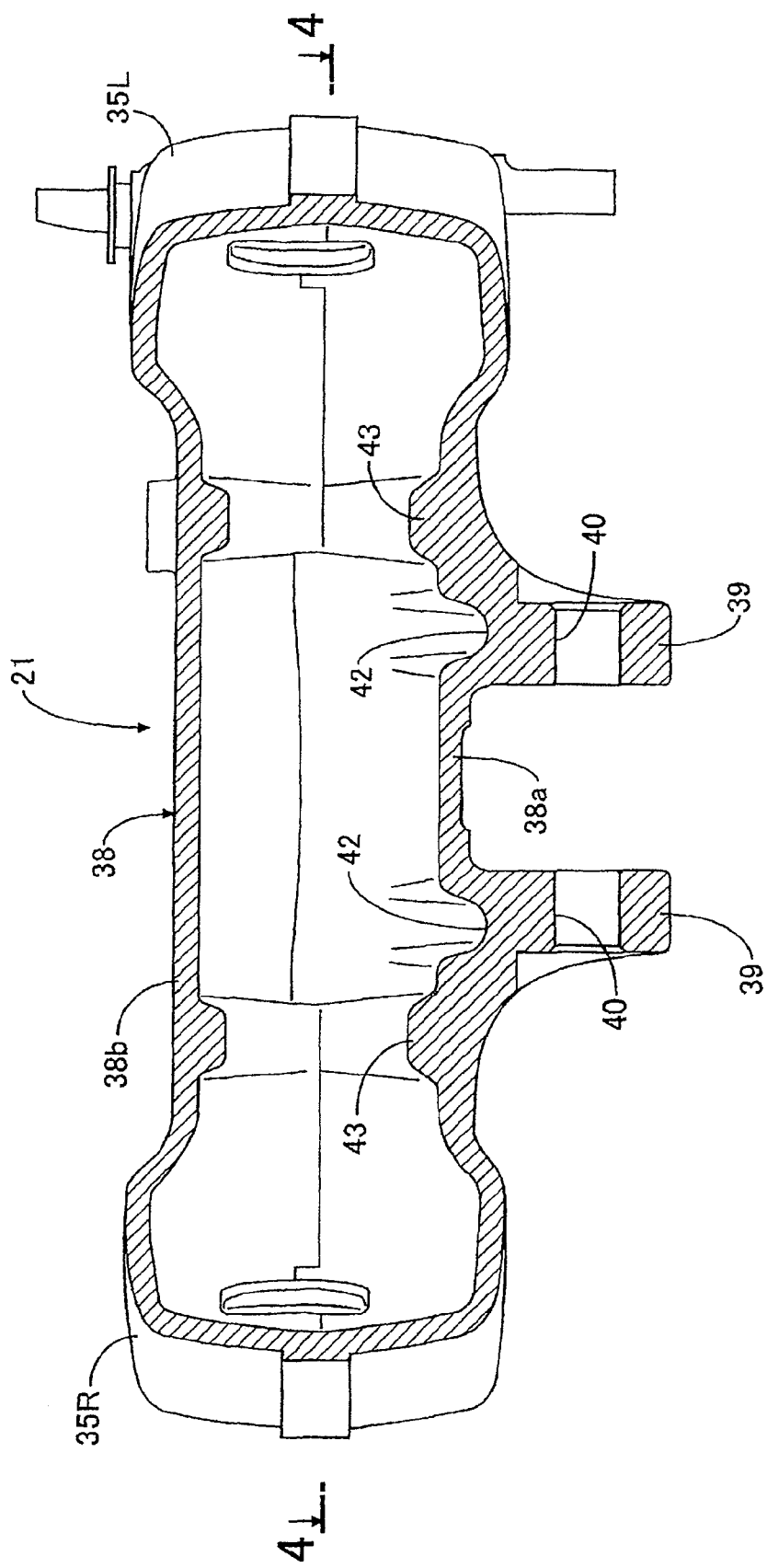
FIG. 3 is an enlarged cross-sectional view of a swing arm taken along a line 3-3 in FIG. 2.
Figure 4:
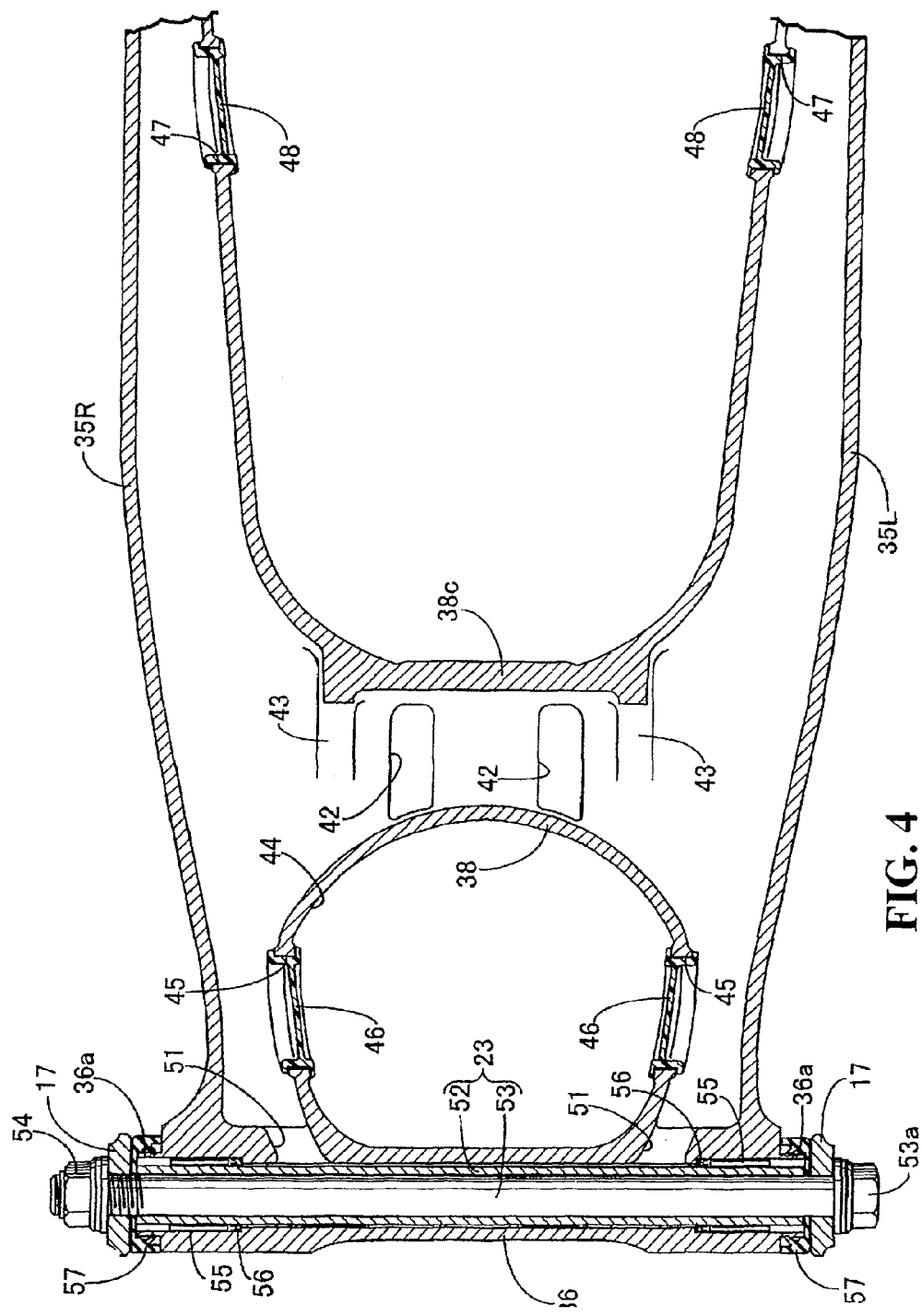
FIG. 4 is a cross-sectional view taken along a line 4-4 in FIG. 3.

To explain the embodiment of the present invention also in conjunction with FIG. 2 to FIG. 4, the swing arm 21 is an integral body constituted of a pair of left and right arm portions 35L, 35R that extends in the longitudinal direction with a pivot portion 36 that is formed front ends of both arm portions 35L, 35R; axle support portions 37 that are formed on rear ends of both arm portions 35L, 35R in a state where the axle support portions 37 pivotally support the axle 22 of the rear wheel WR. A cross portion 38 connects both arm portions 35L, 35R to each other behind the pivot portion 36, wherein the swing arm 21 is formed by integral molding using a light alloy such as aluminum by gravity casting, for example.

At least the cross portion 38 of the swing arm 21 is formed into a hollow shape. In this embodiment, not only the cross portion 38 but also both arm portions 35L, 35R are formed into an angular cylindrical shape having a rectangular transverse cross section. The pivot portion 36 that connects the front ends of both arm portions 35L, 35R to each other is contiguously formed with both arm portions 35L, 35R in the vehicle widthwise direction and are formed into a hollow circular cylindrical shape. Further, communication holes 51, 51 that make the inside of the arm portions 35L, 35R communicated with the inside of the pivot portion 36 are formed in connecting portions between both arm portions 35L, 35R and the pivot portion 36.

The pivot portion 36 is pivotally supported on the lower portions of the pair of left and right pivot frames 17 by way of the support shaft 23 that is made to pass through the pivot portion 36. The support shaft 23 is constituted of a circular cylindrical collar 52 that is made to pass through the pivot portion 36 over the whole length of the pivot portion 36, and a bolt 53 that is made to pass through the pair of left and right pivot frames 17 and the collar 52. An enlarged diameter head portion 53a of the bolt 53 is engaged with and brought into contact with an outer side surface of the pivot frame 17 on one side. A nut 54 is threadedly engaged with a portion of the bolt 53 projecting from the pivot frame 17 on the other side.

Needle bearings 55, 55 that constitute a pair of left and right bearings are interposed between the collar 52 of the support shaft 23 and the pivot portion 36 in a state where the needle bearings 55, 55 are arranged outside the pair of communication holes 51. A pair of left and right first sealing members 56, 56 is interposed between the collar 52 of the support shaft 23 and the pivot portion 36 as well as between the needle bearings 55 and the communication holes 51.

Further, a pair of left and right second sealing members 57, 57 that is arranged between both needle bearings 55 and the outside is interposed between the pivot portion 36 and the support shaft 23. More specifically, the pivot portion 36 includes, as integral parts thereof, small-diameter cylindrical portions 36a, 36a that have a narrowed outer diameter at both ends thereof, project outwardly and are arranged coaxially with the pivot portion 36, and the second sealing members 57 that are formed into a cap shape are arranged in a sandwiched manner between the pivot frames 17 and end portions of the small-diameter cylindrical portions 36a in a state where the second sealing members 57 close both end opening portions of the small-diameter cylindrical portions 36a and are resiliently brought into contact with outer peripheries of the small-diameter cylindrical portions 36a.

A pair of support bosses 39, 39 that projects outwardly from a lower wall 38a or an upper wall 38b of the cross portion 38 is integrally formed on the cross portion 38. In this embodiment, a pair of left and right support bosses 39, 39 is integrally formed on the cross portion 38 in a downwardly projecting manner from the lower wall 38a of the cross portion 38.

A lower end portion of the shock absorber 27 is supported on the support bosses 39 by way of the link member 26 that constitutes a portion of the link mechanism 24, and support holes 40 through that a connection shaft 41 (see FIG. 2) for rotatably connecting the link member 26 to the support bosses 39 is made to pass are concentrically formed in the support bosses 39.

Further, as shown in FIG. 2, the support holes 40 are arranged behind center portions of the support bosses 39 in the longitudinal direction. That is, the support holes 40 are formed in the support bosses 39 such that a center axis of the support holes 40 is arranged behind a center portion C wherein a distance L from a front end of the support boss 39 to the center portion C and a distance L from a rear end of the support boss 39 to the center portion C are equal.

Out of the lower wall 38a and the upper wall 38b of the cross portion 38, on an inner surface of the wall on that the support bosses 39 are formed in a projecting manner, that is, on an inner surface of the lower wall 38a, a pair of left and right recessed portions 42, 42 that is indented toward a support boss 39 side is formed, and also a pair of left and right reinforcing ribs 43, 43 that is positioned outside the recessed portions 42 in the vehicle widthwise direction is integrally formed in a projecting manner toward the inside of the cross portion 38. Further, the reinforcing ribs 43 are formed in a frontwardly extending manner from a rear wall 38c of the cross portion 38. The reinforcing ribs 43 are formed in a projecting manner integrally contiguous with an inner surface of the rear wall 38c of the cross portion 38, an inner surface of the lower wall 38a, and an inner surface of a rear half portion of the upper wall 38b of the cross portion 38 in such a manner that front ends of the reinforcing ribs 43 are positioned in front of rear ends of the recessed portions 42.

An opening portion 44 whose peripheral portion is endlessly contiguously formed and whose upper and lower ends are opened is formed by the cross portion 38, the pivot portion 36 and the pair of left and right arm portions 35L, 35R, and the shock absorber 27 is made to pass through the opening portion 44. Further, core removing holes 45, 45 through that a sand core used in forming the swing arm 21 by molding is removed are formed in inner walls of both arm portions 35L, 35R at portions where the core removing holes 45, 45 face the opening portion 44. Caps 46, 46 are mounted on the respective core removing holes 45 after the formation of the swing arm 21 by molding is completed.

Further, as shown in FIG. 4, core removing holes 47, 47 through that a sand core is removed are also formed in inner walls of rear portions of the pair of left and right arm portions 35L, 35R with caps 48, 48 being mounted on the respective core removing holes 47.

Further, as shown in FIG. 1 and FIG. 2, a chain case 49 is mounted on an upper wall of the rear portion of the left arm portion 35L of the swing arm 21, and a chain guide 50 is mounted on a lower wall of the rear portion of the arm portion 35L.

Next, to explain the manner of operation of this embodiment, the swing arm 21 is an integral body formed by molding and is constituted of the pair of left and right arm portions 35L, 35R that extend in the longitudinal direction with the pivot portion 36 that is formed between the front ends of both arm portions 35L, 35R. Axle support portions 37 are mounted on the rear ends of both arm portions 35L, 35R in a state where the axle support portions 37 pivotally support the axle 22 of the rear wheel WR; and the cross portion 38 that connects both arm portions 35L, 35R to each other behind the pivot portion 36, wherein at least the cross portion 38 is formed into a hollow shape, and the pair of left and right support bosses 39, 39 for supporting the shock absorber 27 is integrally formed with the cross portion 38 in a downwardly projecting manner from the lower wall 38a of the cross portion 38. In such a construction, the pivot portion 36 is contiguously formed with both arm portions 35L, 35R in the vehicle widthwise direction in a state wherein the pivot portion 36 connects the front ends of both arm portions 35L, 35R to each other, and the opening portion 44 whose peripheral portion is endlessly contiguously formed and whose upper and lower ends are opened is formed by the cross portion 38, the pivot portion 36 and the pair of left and right arm portions 35L, 35R. Thus, the rigidity of the front portion of the swing arm 21 can be increased.

The pair of left and right recessed portions 42, 42 that is indented toward the support bosses 39 side is formed on the inner surface of the lower wall 38a of the cross portion 38, and the pair of left and right reinforcing ribs 43, 43 that is positioned outside the respective recessed portions 42 in the vehicle widthwise direction is integrally formed on the inner surface of the lower wall 38a in a projecting manner toward the inside of the cross portion 38. Accordingly, the rigidity of the cross portion 38 can be efficiently increased while suppressing a wall thickness of the cross portion 38 from being increased at portions where the support bosses 39 are formed and thereby the occurrence of cavities can be suppressed.

Further, the support holes 40 that are arranged behind the center portion of the support bosses 39 in the longitudinal direction are formed in the support bosses 39, the reinforcing ribs 43 are formed in a frontwardly extending manner from the rear wall 38c of the cross portion 38, and the front ends of the reinforcing ribs 43 are arranged in front of the rear ends of the recessed portions 42. Accordingly, the rigidity of the rear wall 38c can be efficiently increased by the reinforcing ribs 43 corresponding to the increase of a stress applied to the rear wall 38c of the cross portion 38.

Further, the arm portions 35L, 35R are formed into an angular cylindrical shape having a rectangular transverse cross section. Thus, the rigidity of the arm portions 35L, 35R can be increased while reducing the number of parts.

Further, the shock absorber 27 that extends in the vertical direction is made to pass through the opening portion 44 in a state where the shock absorber 27 is supported on the support bosses 39 that project outwardly from the lower wall 38a of the cross portion 38, and the core removing holes 45 through which a core is removed are formed in the inner walls of both arm portions 35L, 35R at portions where the core removing holes 45 face the opening portion 44. Accordingly, the core removing holes 45 are formed in portions of the swing arm 21 that are endlessly contiguously formed where the rigidity is increased. Thus, it is possible to suppress a large reduction in the rigidity of the swing arm 21 due to the formation of the core removing holes 45.

Further, the communication holes 51 that make the insides of the arm portions 35L, 35R communicate with the inside of the pivot portion 36 are formed in the connecting portions between both arm portions 35L, 35R and the pivot portion 36. Accordingly, a wall thickness of the swing arm 21 that is formed by integral molding can be made uniform, the occurrence of cavities can be suppressed, and cores for forming the arm portions 35L, 35R and a core for forming the pivot portion 36 can be formed as an integral part.

The pair of left and right needle bearings 55 is interposed between the support shaft 23 that is made to pass through the pivot portion 36 and the pivot portion 36 in a state where the needle bearings 55 are arranged outside the pair of communication holes 51. The pair of left and right first sealing members 56 that is arranged between the respective needle bearings 55 and the communication holes 51 and the pair of left and right second sealing members 57 that is arranged between both needle bearings 55 and the outside are interposed between the pivot portion 36 and the support shaft 23. Accordingly, the intrusion of water into the needle bearings 55 that are interposed between the support shaft 23 and the pivot portion 36 and are arranged outside the communication holes 51 from the communication holes 51 side and the intrusion of water into the needle bearings 55 from the outside can be prevented by the first and second sealing members 56, 57.

Although the embodiment of the present invention has been explained heretofore, the present invention is not limited to the above-mentioned embodiment, and various modifications in design are conceivable without departing from the present invention described in claims.

For example, in the above-mentioned embodiment, although the explanation has been made with respect to the swing arm for a motorcycle, the present invention is widely applicable to a swing arm of a miniaturized vehicle including the motorcycle and a motor tricycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm for a vehicle comprising:
a pair of left and right arm portions extending in a longitudinal direction;
a pivot portion formed on front ends of both arm portions;
an axle support portion formed on rear ends of both arm portions in a state where the axle support portion pivotally supports an axle of a rear wheel;
a cross portion arranged between both arm portions for connecting both arm portions behind the pivot portion wherein both arm portions are integrally formed with each other by molding;
at least the cross portion is formed into a hollow shape with a pair of left and right support bosses adapted for supporting a shock absorber being integrally formed on a lower wall or an upper wall of the cross portion in an outwardly projecting manner;
wherein the pivot portion is contiguously formed with both arm portions in a vehicle widthwise direction in a state where the pivot portion connects the front ends of both arm portions to each other;
an opening portion whose peripheral portion is endlessly contiguously formed and whose upper and lower ends are opened is formed by the cross portion, the pivot portion and the pair of left and right arm portions;
a pair of left and right recessed portions indented toward a support boss side, said pair of left and right recessed portions being formed on an inner surface of a wall wherein the support bosses are formed to project outwardly from the lower wall of the cross portion; and
a pair of left and right reinforcing ribs positioned outside the recessed portions in the vehicle widthwise direction is integrally formed on the inner surface of the wall on which the support bosses are formed in a projecting manner toward the inside of the cross portion.

2. The swing arm for a vehicle according to claim 1, wherein the arm portions are formed into an angular cylindrical shape having a rectangular transverse cross section.

3. The swing arm for a vehicle according to claim 2, and further including a shock absorber projecting vertically, said shock absorber being made to pass through the opening portion in a state where the shock absorber is supported by the support bosses that project toward outwardly from the lower wall of the cross portion, and core removal holes through which a core is removed are formed on inner walls of both arm portions at portions where the core removal holes face the opening portion.

4. The swing arm for a vehicle according to claim 3, wherein communication holes for making the inside of the arm portions communicate with the inside of the pivot portion are formed in connecting portions between both arm portions and the pivot portion respectively.

5. The swing arm for a vehicle according to claim 4, wherein a pair of left and right bearings is interposed between a support shaft made to pass through the pivot portion and the pivot portion in a state where the left and right bearings are arranged outside the pair of communication holes, and a pair of left and right first seal members arranged between the bearings and the communication holes and a pair of left and right second seal members arranged between both bearings and pivot frames are interposed between the pivot portion and the support shaft.

6. The swing arm for a vehicle according to claim 2, wherein communication holes for making the inside of the arm portions communicate with the inside of the pivot portion are formed in connecting portions between both arm portions and the pivot portion respectively.

7. The swing arm for a vehicle according to claim 1, wherein a support hole is formed in each support boss behind a center portion of the support boss in the longitudinal direction of the support boss, and the reinforcing ribs are formed in a frontwardly projecting manner from a rear wall of the cross portion, and front ends of the reinforcing ribs are positioned in front of rear ends of the recessed portions.

8. The swing arm for a vehicle according to claim 7, wherein the arm portions are formed into an angular cylindrical shape having a rectangular transverse cross section.

9. The swing arm for a vehicle according to claim 8, and further including a shock absorber projecting vertically, said shock absorber being made to pass through the opening portion in a state where the shock absorber is supported by the support bosses that project toward outwardly from the lower wall of the cross portion, and core removal holes through which a core is removed are formed on inner walls of both arm portions at portions where the core removal holes face the opening portion.

10. The swing arm for a vehicle according to claim 8, wherein communication holes for making the inside of the arm portions communicate with the inside of the pivot portion are formed in connecting portions between both arm portions and the pivot portion respectively.

11. A swing arm for a vehicle comprising:
a pair of left and right arm portions being integrally formed with each other by molding, said pair of left and right arm portions extending in a longitudinal direction;
a pivot portion formed on front ends of both arm portions;
an axle support portion formed on rear ends of both arm portions;
a cross portion arranged between both arm portions for connecting both arm portions behind the pivot portion;
said cross portion being formed into a hollow shape with a pair of left and right support bosses adapted to support a shock absorber being integrally formed on a lower wall of the cross portion in an outwardly projecting manner;
a pair of left and right recessed portions indented toward a support boss side, said pair of left and right recessed portions being formed on an inner surface of a wall wherein the support bosses are formed to project outwardly from the lower wall of the cross portion; and
a pair of left and right reinforcing ribs positioned outside the recessed portions in a vehicle widthwise direction is integrally formed on the inner surface of the wall on which the support bosses are formed in a projecting manner toward the inside of the cross portion.

12. The swing arm for a vehicle according to claim 11, wherein the arm portions are formed into an angular cylindrical shape having a rectangular transverse cross section.

13. The swing arm for a vehicle according to claim 12, and further including a shock absorber projecting vertically, said shock absorber being made to pass through the opening portion in a state where the shock absorber is supported by the support bosses that project toward outwardly from the lower wall of the cross portion, and core removal holes through which a core is removed are formed on inner walls of both arm portions at portions where the core removal holes face the opening portion.

14. The swing arm for a vehicle according to claim 13, wherein communication holes for making the inside of the arm portions communicate with the inside of the pivot portion are formed in connecting portions between both arm portions and the pivot portion respectively.

15. The swing arm for a vehicle according to claim 14, wherein a pair of left and right bearings is interposed between a support shaft made to pass through the pivot portion and the pivot portion in a state where the left and right bearings are arranged outside the pair of communication holes, and a pair of left and right first seal members arranged between the bearings and the communication holes and a pair of left and right second seal members arranged between both bearings and pivot frames are interposed between the pivot portion and the support shaft.

16. The swing arm for a vehicle according to claim 12, wherein communication holes for making the inside of the arm portions communicate with the inside of the pivot portion are formed in connecting portions between both arm portions and the pivot portion respectively.

17. The swing arm for a vehicle according to claim 11, wherein a support hole is formed in each support boss behind a center portion of the support boss in the longitudinal direction of the support boss, and the reinforcing ribs are formed in a frontwardly projecting manner from a rear wall of the cross portion, and front ends of the reinforcing ribs are positioned in front of rear ends of the recessed portions.

18. The swing arm for a vehicle according to claim 17, wherein the arm portions are formed into an angular cylindrical shape having a rectangular transverse cross section.

19. The swing arm for a vehicle according to claim 18, and further including a shock absorber projecting vertically, said shock absorber being made to pass through the opening portion in a state where the shock absorber is supported by the support bosses that project toward outwardly from the lower wall of the cross portion, and core removal holes through which a core is removed are formed on inner walls of both arm portions at portions where the core removal holes face the opening portion.

20. The swing arm for a vehicle according to claim 18, wherein communication holes for making the inside of the arm portions communicate with the inside of the pivot portion are formed in connecting portions between both arm portions and the pivot portion respectively.

* * * * *